United States Patent
Mitsui (10) Patent No.: US 8,019,165 B2
(45) Date of Patent: Sep. 13, 2011

(54) IMAGE PROCESSING APPARATUS, IMAGE PROCESSING METHOD, DEFECT DETECTION METHOD, SEMICONDUCTOR DEVICE MANUFACTURING METHOD, AND PROGRAM

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1181 days.

(21) Appl. No.: 11/785,693

(22) Filed: Apr. 19, 2007

(65) Prior Publication Data

US 2007/0280547 A1 Dec. 6, 2007

(30) Foreign Application Priority Data

Apr. 20, 2006 (JP) .................. 2006-116780

(51) Int. Cl.
*G06K 9/36* (2006.01)
*G06K 9/00* (2006.01)
(52) U.S. Cl. ...................... 382/232; 382/253
(58) Field of Classification Search .................. 382/253, 382/232–251; 375/240.01–240.29; 348/414.1, 348/417.1–418.1, 420.1, 422.1
See application file for complete search history.

(56) References Cited

U.S. PATENT DOCUMENTS

| | | | | |
|---|---|---|---|---|
| 4,797,945 | A * | 1/1989 | Suzuki et al. | 382/253 |
| 6,360,019 | B1 | 3/2002 | Chaddha | |
| 6,377,706 | B1 | 4/2002 | De Queiroz | |
| 6,748,113 | B1 * | 6/2004 | Kondo et al. | 382/232 |
| 7,286,713 | B2 * | 10/2007 | Chang et al. | 382/250 |
| 7,418,148 | B2 * | 8/2008 | Hayashi | 382/251 |
| 2004/0120587 | A1 * | 6/2004 | Chang et al. | 382/233 |
| 2005/0163389 | A1 | 7/2005 | Ohmi et al. | |

FOREIGN PATENT DOCUMENTS

| | | |
|---|---|---|
| JP | 11-8848 | 1/1999 |
| JP | 2003-178314 | 6/2003 |

OTHER PUBLICATIONS

Notification of Reasons for Rejection issued by the Japanese Patent Office on Jul. 30, 2010, for Japanese Patent Application No. 2006-116780, and English-language translation thereof.

* cited by examiner

*Primary Examiner* — Sherali Ishrat
(74) *Attorney, Agent, or Firm* — Finnegan, Henderson, Farabow, Garrett & Dunner, L.L.P.

(57) ABSTRACT

An image processing apparatus which compresses an image, the apparatus includes: a storage unit which stores a code book, the code book being prepared by allocating identification codes to code blocks, the code blocks being formed by executing quantization processing regarding a plurality of first image blocks as multidimensional vectors, the plurality of first image blocks being generated by cutting, in preset sizes, first regions out of a code book preparation image containing a first edge, each of the first regions surrounding and including an edge point of the first edge, the first edge being detected from the code book preparation image; an edge detection unit which detects a second edge from a compression target image containing the second edge; an image block generation unit which cuts, in preset sizes, second regions out of the compression target image to generate a plurality of second image blocks, each of the second regions surrounding and including an edge point of the detected second edge; a search unit which searches the code book stored in the storage unit for code blocks similar to the second image blocks; and an output unit which outputs information on the identification codes of the similar code blocks which have been searched for and information on coordinates of the edge points of the second image blocks.

14 Claims, 7 Drawing Sheets

FIG. 6D  135 DEGREES

FIG. 6C  90 DEGREES

FIG. 6B  45 DEGREES

FIG. 6A  0 DEGREE

|  | PREPARATION SOURCE OF CODE BOOK (TOOL A) | COMPRESSION TARGET IMAGE (TOOL B) | IMAGE EXPECTED AS REPRODUCTION RESULT |
|---|---|---|---|
| (i) | TOOL A Images | TOOL B Images | TOOL A like TOOL B images |
| (ii) | 2048 × 2048 | 512 × 512 | High resolution images |
| (iii) | 200k Mag. | 100k Mag. | High resolution images |
| (iv) | Non-charged Images | Charged Images | Charging effect removal |
| (v) | Without Defects | With Defects | Defect detection |
| (vi) | Without under layer | With under layer | Under layer inpainting |
| (vii) | Normal Images | CAD Patterns | Artificial SEM images |

FIG. 7

| IMAGE SIZE | ISDN (64kbps) | ADSL (1500kbps) | FTTH (40000kbps) | FireWire 400 |
|---|---|---|---|---|
| 512 × 512 | 32sec | 1.4sec | 0.05sec | 0.005sec |
| 2048 × 2048 | 8.5min | 22sec | 0.8sec | 0.08sec |
| 4096 × 4096 | 34min | 1.5min | 3.3sec | 0.3sec |

FIG. 8

IMAGE PROCESSING APPARATUS, IMAGE PROCESSING METHOD, DEFECT DETECTION METHOD, SEMICONDUCTOR DEVICE MANUFACTURING METHOD, AND PROGRAM

CROSS REFERENCE TO RELATED APPLICATION

This application claims benefit of priority under 35USC §119 to Japanese patent application No. 2006-116780, filed on Apr. 20, 2006, the contents of which are incorporated by reference herein.

BACKGROUND OF THE INVENTION

1. Field of the Invention

The present invention relates to an image processing apparatus, an image processing method, a defect detection method, a semiconductor device manufacturing method, and a program.

2. Related Background Art

A conventional art and its problems are described taking as an example a scanning electron microscope (SEM) image of a micropattern formed in a semiconductor manufacturing process.

Dimensional measurement using a CD (critical dimension)—SEM is conducted to evaluate a micropattern of a semiconductor. The CDSEM acquires an SEM image in which a measurement target pattern is observed from above, and the dimensions of parts of the pattern are measured by an apparatus on the basis of the SEM image. Here, the acquired SEM image may be stored in a storage medium such as an HDD connected to an EWS for the purpose of subsequent remeasurement and reobservation. When the image is measured, it is preferable to use a pixel base format such as device independent bitmap (BWP) as a format of the image to be saved, in order to prevent the deterioration of measurement accuracy at the time of measurement. The BMP has been widely spread as a standard image format for Windows (registered trademark) independent of the model of a PC, but has a disadvantage that the file size of an image is increased. For example, the file size runs up to 16 BM in the case of an 8-bit gray scale image having a size of 4096×4096, which wastes storage medium resources for data storage such as the HDD and CPU resources of the PC for executing image processing. There are also problems of an increased load on a network and longer time required for transfer when the image data is transferred via the network.

An image file is compressed by a run length encoding (RLE) method which carries out lossless compression to reduce the size of the file when the image file is stored on, for example, the HDD, and the image file is decompressed when the image therein is used, such that it is possible to save the storage medium resources such as the HDD. However, in the case of a natural image such as the SEM image, effects of the reduction of the image size by the compression are generally small, and new CPU resources and processing time are required for the compression and decompression.

Furthermore, when the image is transferred through a network such as the Internet, it is possible to use joint photographic experts group (JPEG) which is a normally used compression image format with high compression efficiency. The JPEG is an image format developed for the compression and saving of the natural images. The JPEG provides lossless compression, but has an advantage of being capable of reducing the file sizes of some images several ten times. However, while the JPEG allows the designation of a compression ratio at the time of saving the image, the JPEG has disadvantages that high-frequency components are lost and the degree of deterioration becomes higher in information of the edge of the image when the compression ratio is increased and that the measurement accuracy decreases at the time of measurement. Thus, the JPEG image is not suitable to the image format for measurement.

In addition to the JPEG, there has also been proposed a method called vector quantization (VQ) compression as a method suitable to the compression of a line image such as an illustration rather than the natural image. This method is characterized by the use of what is called a code book which is prepared in the following manner: an image is divided into small image blocks, each of the divided image blocks is regarded as one point in a multidimensional space, vector quantization is carried out to reduce the kinds of image blocks, and identification code numbers are assigned to the quantized image blocks.

However, the weakness of this method is the appearance of the seams of the blocks in a reproduced image. Although human eyes can be deceived, this method still remains unsuitable to the measurement as in the case of the JPEG.

Figure 8:
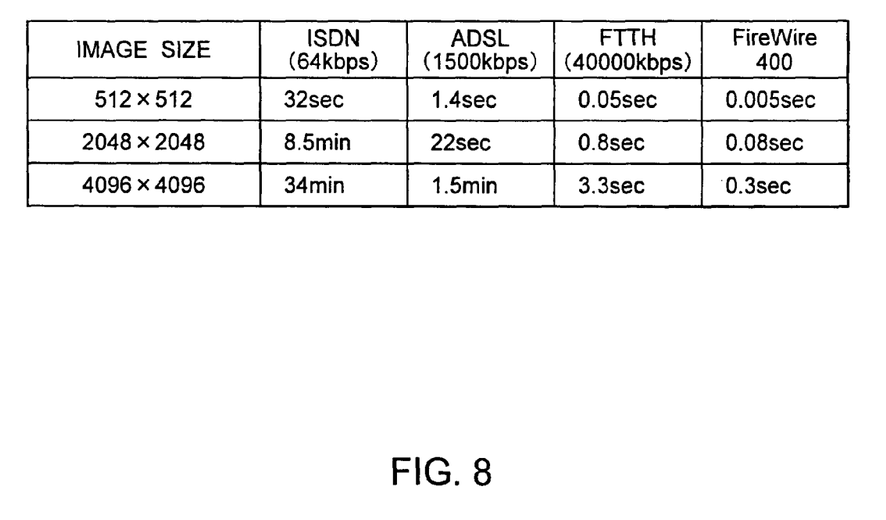
FIG. 8 is a table showing the relation between circuit speeds and transfer times for each image size in a conventional art.

In measuring the image data via the network, means for reducing the load on the network is especially important when the target of the measurement is an image with a large size. FIG. 8 is a table showing the relation between circuit speeds and transfer times for each image size. It can be understood from FIG. 8 that about three seconds are required to transfer an image of 4096×4096 even by an FTTH circuit of 40 Mbps and that the speed of measurement processing is limited when a large volume of images are measured. Moreover, images targeted for measurement are generally images of products in mass production factories, and when these images as company secrets go outside through the Internet connection, a serious problem is caused in terms of security. Measurements can be taken for this problem by, for example, encrypting the images, but there is another problem of the requirement of heavy CPU resources and processing time for the encoding and decoding for the encryption.

SUMMARY OF THE INVENTION

According to a first aspect of the present invention, there is provided an image processing apparatus which compresses an image, comprising:

a storage unit which stores a code book, the code book being prepared by allocating identification codes to code blocks, the code blocks being formed by executing quantization processing regarding a plurality of first image blocks as multidimensional vectors, the plurality of first image blocks being generated by cutting, in preset sizes, first regions out of a code book preparation image containing a first edge, each of the first regions surrounding and including an edge point of the first edge, the first edge being detected from the code book preparation image;

an edge detection unit which detects a second edge from a compression target image containing the second edge;

an image block generation unit which cuts, in preset sizes, second regions out of the compression target image to generate a plurality of second image blocks, each of the second regions surrounding and including an edge point of the detected second edge;

a search unit which searches the code book stored in the storage unit for code blocks similar to the second image blocks; and an output unit which outputs information on the identification codes of the similar code blocks which have been searched for and information on coordinates of the edge points of the second image blocks.

According to a second aspect of the present invention, there is provided an image processing apparatus which reproduces a compressed image subjected to compression processing, the apparatus comprising:

a storage unit which stores information on a code book, the code book being prepared during the compression processing by allocating identification codes to code blocks, respectively, the code blocks being formed by executing quantization processing regarding a plurality of first image blocks as multidimensional vectors, the plurality of first image blocks being generated by cutting, in preset sizes, first regions out of a code book preparation image containing a first edge, each of the first regions surrounding and including an edge point of the first edge, the first edge being detected from the code book preparation image;

a reading unit which reads coordinates of second edge points and identification codes of the compressed image, the compressed image being defined by the coordinates of the second edge points and the identification codes of code blocks similar to second image blocks among the code blocks carried by the code book, the second image blocks being image blocks of the compressed image; and an image block composition unit which takes, from the code book, the code blocks corresponding to the read identification codes to write these code blocks into a reproduced image region around the coordinates of the second edge points in order to form a reproduced image.

According to a third aspect of the present invention, there is provided an image processing method comprising an image compression method, the image compression method including:

detecting a first edge from a code book preparation image having the first edge;

cutting, in preset sizes, first regions out of the code book preparation image to generate a plurality of first image blocks, each of the first regions surrounding and including an edge point of the detected first edge;

executing quantization processing regarding the plurality of first image blocks as multidimensional vectors to form code blocks;

allocating identification codes to the code blocks to prepare a code book;

detecting a second edge from a compression target image having the second edge;

cutting, in preset sizes, second regions out of the compression target image to generate a plurality of second image blocks, each of the second regions surrounding and including an edge point of the detected second edge;

searching the code book for code blocks similar to the second image blocks; and outputting coordinates of the edge points of the second image blocks and the identification codes of the similar code blocks.

According to a fourth aspect of the present invention, there is provided an image processing method comprising an image reproduction method of reproducing a compressed image containing an edge and subjected to compression processing, the image reproduction method including:

acquiring information on a code book, the code book being prepared during the compression processing by allocating identification codes to code blocks, respectively, the code blocks being formed by executing quantization processing regarding a plurality of first image blocks as multidimensional vectors, the plurality of first image blocks being generated by cutting out, in preset sizes, first regions out of a code book preparation image containing a first edge, each of the first regions surrounding and including an edge point of the first edge, the first edge being detected from the code book preparation image;

reading coordinates of second edge points and identification codes of the compressed image, the compressed image being defined by the coordinates of the second edge points and the identification codes of code blocks similar to second image blocks, the second image blocks being image blocks of the compressed image among the code blocks carried by the code book; and taking, from the code book, the code blocks corresponding to the read identification codes to write these code blocks into a reproduced image region around the coordinates of the second edge points in order to form a reproduced image.

According to a fifth aspect of the present invention, there is provided a method of detecting a defect in an imaged object, the method comprising:

detecting a first edge and the directions of the first edge from a code book preparation image having the first edge;

cutting, in preset sizes, first regions out of the code book preparation image to generate a plurality of first image blocks, each of the first regions surrounding and including an edge point of the detected first edge;

executing quantization processing regarding the first image blocks as multidimensional vectors to form code blocks for each of the directions of the first edge;

allocating identification codes to the code blocks to prepare a code book;

acquiring an image of the imaged object;

detecting a second edge which is the edge of the imaged object and the directions of the second edge from the image of the imaged object;

cutting, in preset sizes, second regions out of the image of the imaged object to generate a plurality of second image blocks, each of the second regions surrounding and including an edge point of the detected second edge;

selecting, from the code book, code blocks corresponding to the directions of the second edge to match these code blocks with the second image blocks, and defining the code blocks which have obtained matching scores exceeding a predetermined threshold value as code blocks similar to the second image blocks; and taking, from the code book, the similar code blocks to write these code blocks into a new image region along the directions of the second edge and around the coordinates of the second edge points, wherein when the second image blocks in which the matching scores are equal to or less than the predetermined threshold value are present in the matching of the second image blocks with the code blocks, the second image blocks are output as they are instead of the code blocks similar to the second image blocks, and the second image blocks are written into the new image region around the coordinates of the second edge points corresponding to a defective place.

According to a sixth aspect of the present invention, there is provided a method of detecting a defect in an imaged object, the method comprising:

detecting a first edge and the directions of the first edge from a code book preparation image having the first edge;

cutting, in preset sizes, first regions out of a code book preparation image to generate a plurality of first image blocks, each of the first regions surrounding and including an edge point of the first edge;

executing quantization processing regarding the first image blocks as multidimensional vectors to form code blocks for each of the directions of the first edge;

allocating identification codes to the code blocks to prepare a code book;

acquiring an image of the imaged objected;

detecting a second edge which is the edge of the imaged object and the directions of the second edge from the image of the imaged object;

cutting, in preset sizes, second regions out of the image of the imaged object to generate a plurality of second image blocks, each of the second regions surrounding and including an edge point of the detected second edge;

selecting, from the code book, code blocks corresponding to the directions of the second edge to match these code blocks with the second image blocks, and defining the code blocks which have obtained matching scores exceeding a predetermined threshold value as code blocks having first identification codes and similar to the second image blocks; and taking, from the code book, the code blocks having the first identification codes to write these code blocks into a new image region along the directions of the second edge and around the coordinates of the second edge points, wherein second identification codes corresponding to the second image blocks in which the matching scores are equal to or less than the predetermined threshold value are preset in the code book, and when the second image blocks in which the matching scores are equal to or less than the predetermined threshold value are present in the matching of the second image blocks with the code blocks, the image blocks whose gradation values are 0 are written into the new image region around the coordinates of the second edge points corresponding to a defective place in accordance with the second identification codes.

According to a seventh aspect of the present invention, there is provided a semiconductor device manufacturing method comprising executing a semiconductor device manufacturing process for a semiconductor substrate judged by a defect detection method for a pattern formed on the semiconductor substrate that the pattern has no defect, the defect detection method including:

detecting a first edge and the directions of the first edge from a code book preparation image having the first edge;

cutting, in preset sizes, first regions out of the code book preparation image to generate a plurality of first image blocks, each of the first regions surrounding and including an edge point of the detected first edge;

executing quantization processing regarding the first image blocks as multidimensional vectors to form code blocks for each of the directions of the first edge;

allocating identification codes to the code blocks to prepare a code book;

acquiring an image of the pattern;

detecting a second edge which is the edge of the pattern and the directions of the second edge from the image of the pattern;

cutting, in preset sizes, second regions out of the image of the pattern to generate a plurality of second image blocks, each of the second regions surrounding and including an edge point of the detected second edge;

selecting, from the code book, code blocks corresponding to the directions of the second edge to match these code blocks with the second image blocks, and defining the code blocks which have obtained matching scores exceeding a predetermined threshold value as code blocks similar to the second image blocks; and taking, from the code book, the similar code blocks to write these code blocks into a new image region around the coordinates of the second edge points and along the directions of the second edge, wherein when the second image blocks in which the matching scores are equal to or less than the predetermined threshold value are present in the matching of the second image blocks with the code blocks, the second image blocks are output as they are instead of the code blocks similar to the second image blocks, and the second image blocks are written into the new image region around the coordinates of the second edge points corresponding to a defective place.

According to an eighth aspect of the present invention, there is provided a semiconductor device manufacturing method comprising executing a semiconductor device manufacturing process for a semiconductor substrate judged by a defect detection method for a pattern formed on the semiconductor substrate that the pattern has no defect, the defect detection method including:

detecting a first edge and the directions of the first edge from a code book preparation image having the first edge;

cutting, in preset sizes, first regions out of the code book preparation image to generate a plurality of first image blocks, each of the first regions surrounding and including an edge point of the first edge;

executing quantization processing regarding the first image blocks as multidimensional vectors to form code blocks for each of the directions of the first edge;

allocating identification codes to the code blocks to prepare a code book;

acquiring an image of a pattern;

detecting a second edge which is the edge of the pattern and the directions of the second edge from the image of the pattern;

cutting, in preset sizes, second regions out of the image of the pattern to generate a plurality of second image blocks, each of the second regions surrounding and including an edge point of the detected second edge;

selecting, from the code book, code blocks corresponding to the directions of the second edge to match these code blocks with the second image blocks, and defining the code blocks which have obtained matching scores exceeding a predetermined threshold value as code blocks having first identification codes and similar to the second image blocks; and taking, from the code book, the code blocks having the first identification codes to write these code blocks into a new image region around the coordinates of the second edge points and along the directions of the second edge, wherein second identification codes corresponding to the second image blocks in which the matching scores are equal to or less than the predetermined threshold value are preset in the code book, and when the second image blocks in which the matching scores are equal to or less than the predetermined threshold value are present in the matching of the second image blocks with the code blocks, the image blocks whose gradation values are 0 are written into the new image region around the coordinates of the second edge points corresponding to a defective place in accordance with the second identification codes.

According to a ninth aspect of the present invention, there is provided a program which is contained in a computer-readable medium and which causes a computer to execute an image processing method comprising an image compression method, the image compression method including:

detecting a first edge from a code book preparation image having the first edge;

cutting, in preset sizes, first regions out of the code book preparation image to generate a plurality of first image blocks, each of the first regions surrounding and including an edge point of the detected first edge;

executing quantization processing regarding the plurality of first image blocks as multidimensional vectors to form code blocks;

allocating identification codes to the code blocks to prepare a code book;

detecting a second edge from a compression target image having the second edge;

cutting, in preset sizes, second regions out of the compression target image to generate a plurality of second image blocks, each of the second regions surrounding and including an edge point of the detected second edge;

searching the code book for code blocks similar to the second image blocks; and     outputting coordinates of the edge points of the second image blocks and the identification codes of the similar code blocks.

According to a tenth aspect of the present invention, there is provided a program which is contained in a computer-readable medium and which causes a computer to execute an image processing method comprising an image reproduction method of reproducing a compressed image containing an edge and subjected to compression processing, the image reproduction method including:

acquiring information on a code book, the code book being prepared during the compression processing by allocating identification codes to code blocks, respectively, the code blocks being formed by executing quantization processing regarding a plurality of first image blocks as multidimensional vectors, the plurality of first image blocks being generated by cutting out, in preset sizes, first regions out of a code book preparation image containing a first edge, each of the first regions surrounding and including an edge point of the first edge, the first edge being detected from the code book preparation image;

reading coordinates of second edge points and identification codes of the compressed image, the compressed image being defined by the coordinates of the second edge points and the identification codes of code blocks similar to second image blocks, the second image blocks being image blocks of the compressed image among the code blocks carried by the code book; and     taking, from the code book, the code blocks corresponding to the read identification codes to write these code blocks into a reproduced image region around the coordinates of the second edge points in order to form a reproduced image.

According to an eleventh aspect of the present invention, there is provided a program which is contained in a computer-readable medium and which causes a computer to execute a method of detecting a defect in an imaged object within a compression target image, the method comprising:

detecting a first edge and the directions of the first edge from a code book preparation image having the first edge;

cutting, in preset sizes, first regions out of the code book preparation image to generate a plurality of first image blocks, each of the first regions surrounding and including an edge point of the detected first edge;

executing quantization processing regarding the first image blocks as multidimensional vectors to form code blocks for each of the directions of the first edge;

allocating identification codes to the code blocks to prepare a code book;

acquiring an image of the imaged object;

detecting a second edge which is the edge of the imaged object and the directions of the second edge from the image of the imaged object;

cutting, in preset sizes, second regions out of the image of the imaged object to generate a plurality of second image blocks, each of the second regions surrounding and including an edge point of the detected second edge;

selecting, from the code book, code blocks corresponding to the directions of the second edge to match these code blocks with the second image blocks, and defining the code blocks which have obtained matching scores exceeding a predetermined threshold value as code blocks similar to the second image blocks; and     taking, from the code book, the similar code blocks to write these code blocks into a new image region along the directions of the second edge and around the coordinates of the second edge points,     wherein when the second image blocks in which the matching scores are equal to or less than the predetermined threshold value are present in the matching of the second image blocks with the code blocks, the second image blocks are output as they are instead of the code blocks similar to the second image blocks, and the second image blocks are written into the new image region around the coordinates of the second edge points corresponding to a defective place.

According to a twelfth aspect of the present invention, there is provided a program which is contained in a computer-readable medium and which causes a computer to execute a method of detecting a defect in an imaged object within a compression target image, the method comprising:

detecting a first edge and the directions of the first edge from a code book preparation image having the first edge;

cutting, in preset sizes, first regions out of a code book preparation image to generate a plurality of first image blocks, each of the first regions surrounding and including an edge point of the first edge;

executing quantization processing regarding the first image blocks as multidimensional vectors to form code blocks for each of the directions of the first edge;

allocating identification codes to the code blocks to prepare a code book;

acquiring an image of the imaged objected;

detecting a second edge which is the edge of the imaged object and the directions of the second edge from the image of the imaged object;

cutting, in preset sizes, second regions out of the image of the imaged object to generate a plurality of second image blocks, each of the second regions surrounding and including an edge point of the detected second edge;

selecting, from the code book, code blocks corresponding to the directions of the second edge to match these code blocks with the second image blocks, and defining the code blocks which have obtained matching scores exceeding a predetermined threshold value as code blocks having first identification codes and similar to the second image blocks; and     taking, from the code book, the code blocks having the first identification codes to write these code blocks into a new image region along the directions of the second edge and around the coordinates of the second edge points,     wherein second identification codes corresponding to the second image blocks in which the matching scores are equal to or less than the predetermined threshold value are preset in the code book, and when the second image blocks in which the matching scores are equal to or less than the predetermined threshold value are present in the matching of the second image blocks with the code blocks, the image blocks whose gradation values are 0 are written into the new image region around the coordinates of the second edge points corresponding to a defective place in accordance with the second identification codes.

DETAILED DESCRIPTION OF THE INVENTION

Embodiments of the present invention will hereinafter be described with reference to the drawings. An SEM image of a micropattern formed in a semiconductor manufacturing process such as a lithography process or an etching process will be described below by way of example, but it should be understood that the present invention is not limited to the SEM image and can be used for subject images in general in various other fields.

(1) First Embodiment

An image processing apparatus according to a first embodiment of the present invention will be described with reference to FIG. 1 and FIG. 2. The image processing apparatus in the present embodiment comprises a code book type image compression unit 2, and a code book type image reproduction unit 4. Hereinafter, a code book means a reference table (look-up table) of a code corresponding to a code vector.

Figure 1:
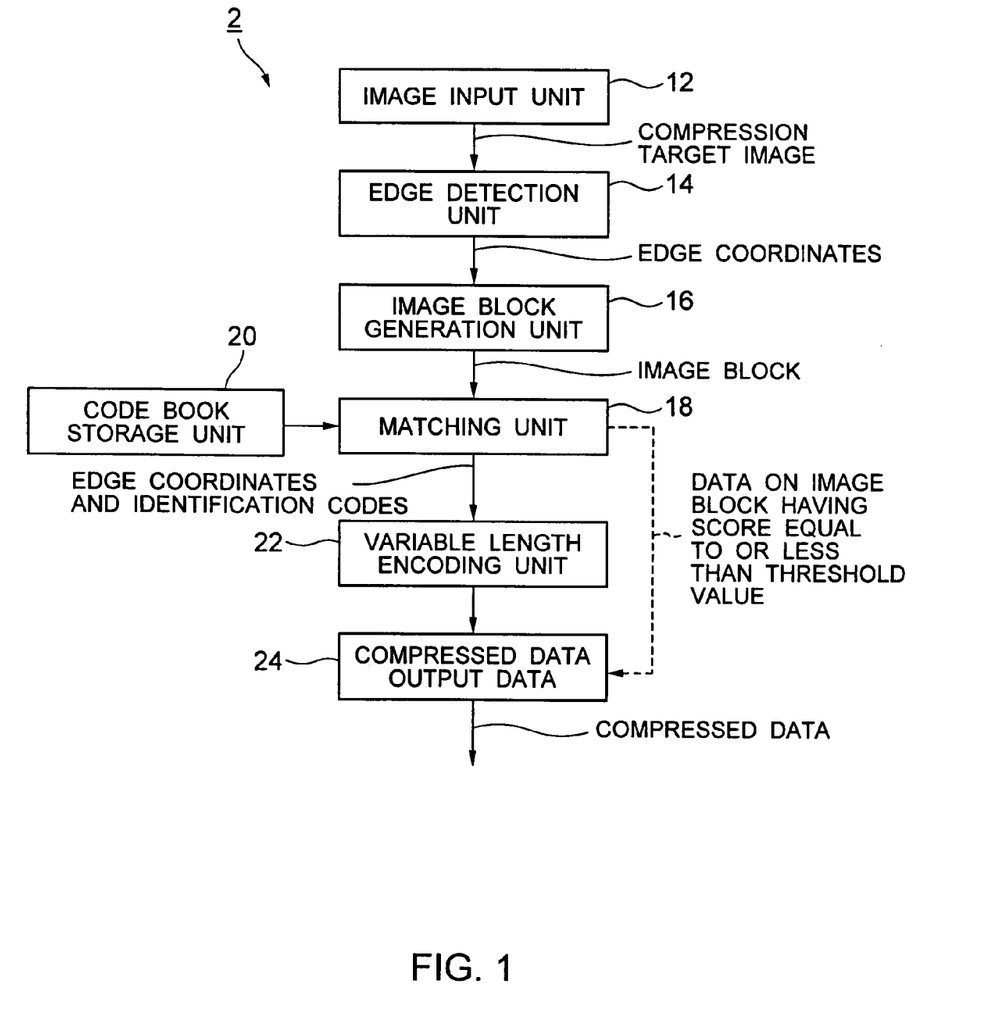
FIG. 1 is a block diagram showing a schematic configuration of an image compression unit according to a first embodiment of the present invention.

FIG. 1 is a block diagram showing a schematic configuration of the image compression unit 2. The image compression unit 2 comprises an image input unit 12, an edge detection unit 14, an image block generation unit 16, a matching unit 18, a code book storage unit 20, a variable length encoding unit 22, and a compressed data output unit 24.

The image input unit 12 acquires a compression target image, and inputs the compression target image to the edge detection unit 14. The edge detection unit 14 detects edge points of a micropattern as image blocks together with the directions thereof from the input compression target image. The image block generation unit 16 cuts out the image around the detected edge points. The code book storage unit 20 stores a code book prepared by procedures 1 to 5 described later. The matching unit 18 selects from the code book an image block whose direction is closest to the direction of the image block added to information on the image blocks supplied from the image block generation unit 16 (matching). The matching unit 18 then supplies information on coordinates of the edge point of the cut-out image block together with an identification code of the selected image block to the variable length encoding unit 22. The variable length encoding unit 22 performs variable length encoding processing on the sent coordinates of the edge point of the image block and on the identification code of the selected image block, and supplies them as compressed data to the compressed data output unit 24. The compressed data output unit 24 outputs the compressed data to the outside. In the present embodiment, the matching unit 18 corresponds to, for example, a searching unit, and the variable length encoding unit 22 and the compressed data output unit 24 correspond to, for example, an output unit.

Figure 2:
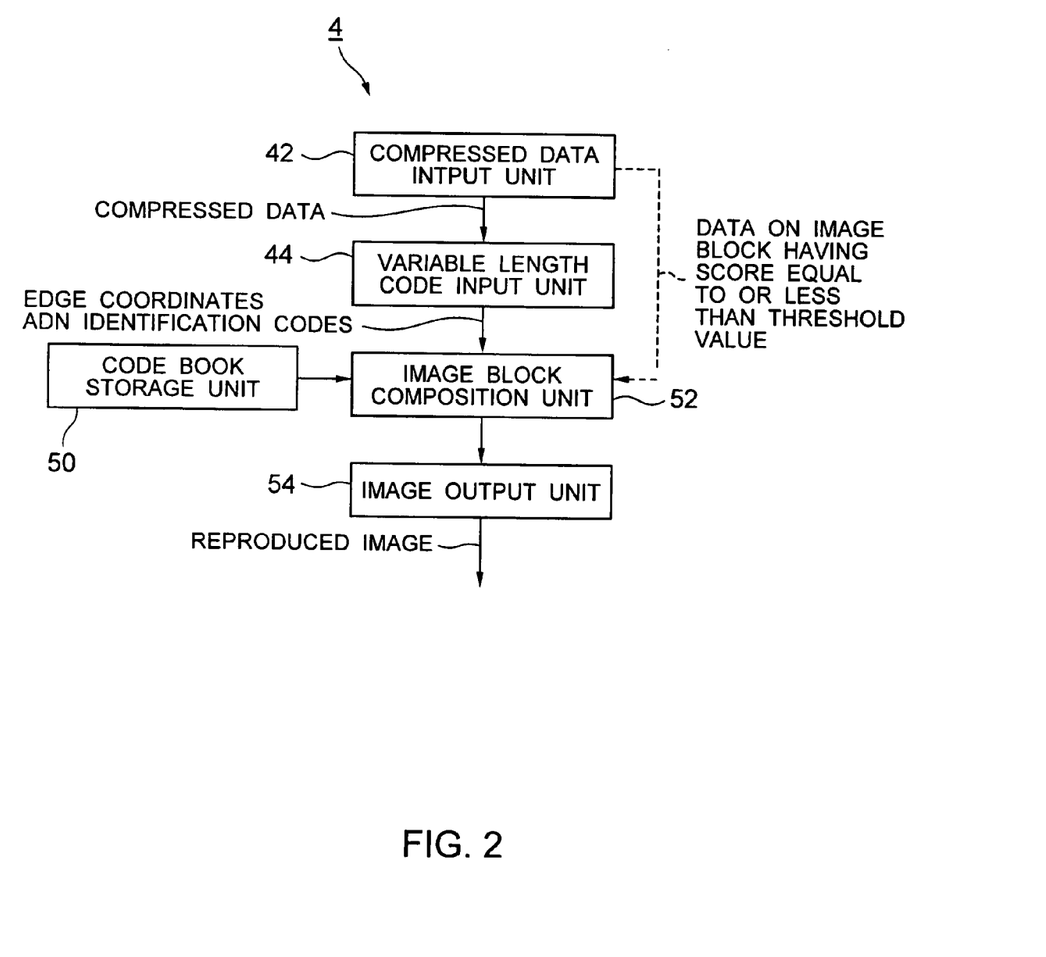
FIG. 2 is a block diagram showing a schematic configuration of an image reproduction unit according to the first embodiment of the present invention.
Figure 3:
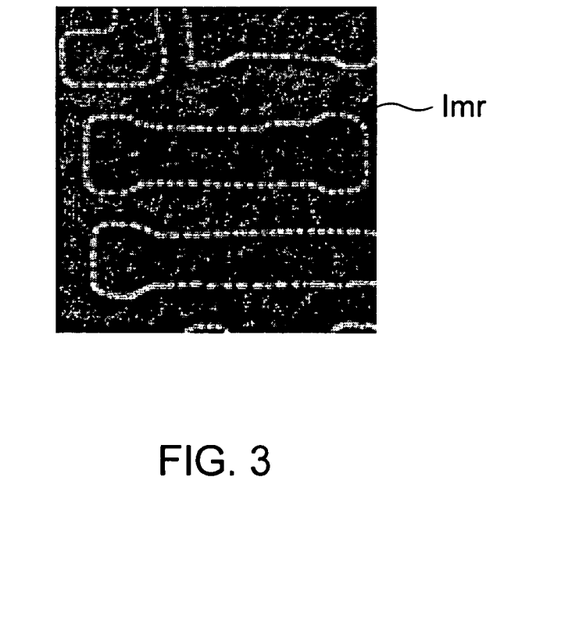
FIG. 3 is a diagram showing one example of a code book preparation image.

FIG. 2 is a block diagram showing a schematic configuration of the image reproduction unit 4. The image reproduction unit 4 comprises a compressed data input unit 42, a variable length code input unit 44, an image block composition unit 52, and an image output unit 54. In response to the supply of the compressed data from the compressed data output unit 24 of the image compression unit 2, the compressed data input unit 42 sends the compressed data to the variable length code input unit 44. The variable length code input unit 44 decompresses the compressed data, and supplies the coordinates of the edge point of the image block and the identification code thereof to the image block composition unit 52. A code book storage unit 50 stores the same code book as the code book stored in the code book storage unit 20 in FIG. 1. The image block composition unit 52 takes, from the code book, the image block corresponding to the identification code around the edge point coordinates sent from the variable length code input unit 44, and writes the image block into a predetermined reproduced image region, thereby forming a reproduced image. The image output unit 54 outputs, as the reproduced image, the image formed by the image block composition unit 52. In the present embodiment, the compressed data input unit 42 and the variable length code input unit 44 correspond to, for example, a reading unit.

Figure 4:
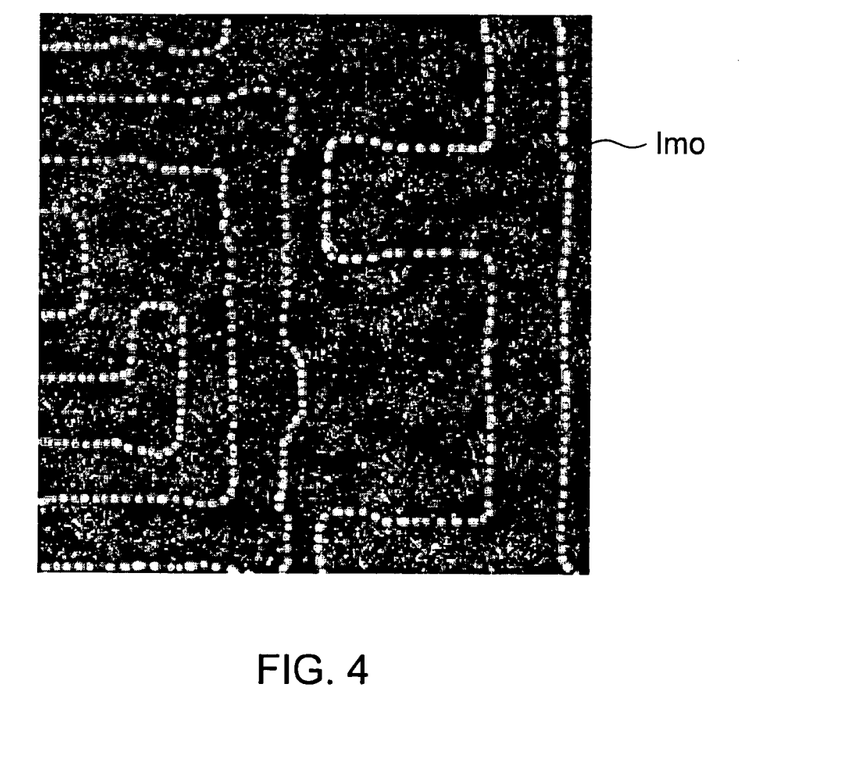
FIG. 4 is a diagram showing one example of a compression target image.

An image compression and reproduction method using the compression unit 2 and the reproduction unit 4 respectively shown in FIG. 1 and FIG. 2 will be described as an image processing method according to the first embodiment of the present invention with reference to FIG. 3 to FIG. 7. The procedures will be described below in detail in which a compression target image Imo (769 KB) in FIG. 4 is compressed using a code book prepared from a code book preparation image Imr shown in FIG. 3, and reproduced as a reproduced image (258 KB) in FIG. 5.

(i) Preparation of Code Book

It is necessary to prepare a code book before the compression of an image. In the present embodiment, there is shown a method in which the code book is prepared using the code book preparation image Imr similar to the compression target image Imo.

(Procedure 1)

A pattern edge is detected from the code book preparation image Imr. The present embodiment is characterized in that not only the edge points but also the direction of the edge is detected at this point. Any algorithm may be used in detecting the edge. For example, according to a method using a Sobel filter, the edge points and the direction of the edge can be detected at the same time. However, the present invention is not limited to this method, and it is possible to use a method which separately obtains the edge points and the direction of the edge. The edge points may be obtained with sub-pixel accuracy, but in the present embodiment, the edge points are detected pixel by pixel at angles of 0, 45, 90 and 135 degrees in accordance with a method of Canny. In addition, 45 degrees are employed here as the degrees of dividing the direction, but the divisions may be smaller or larger depending not only on the quality of the compression target image, but also on specifications required for the use of the image such as measurement.

(Procedure 2)

Figure 6A:
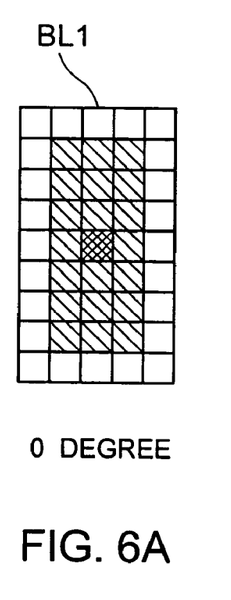
FIGS. 6A to 6D are diagrams explaining a method of cutting out an image block in an image compression method according to the first embodiment of the present invention.
Figure 6B:
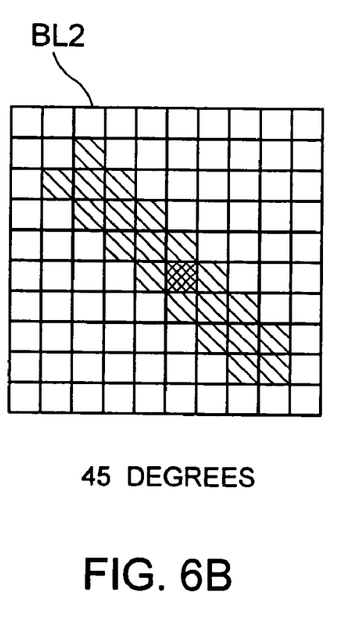
Figure 6C:
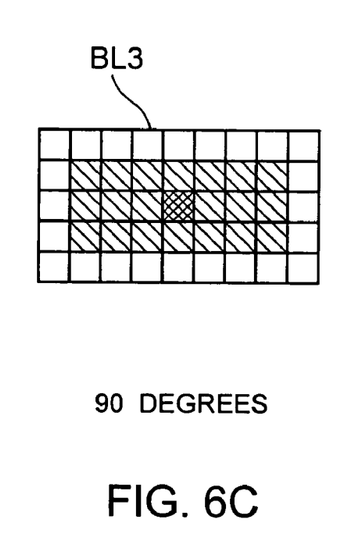
Figure 6D:
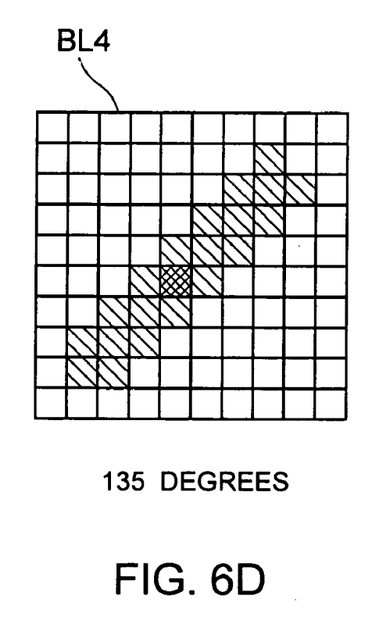

Next, an image of a region having a predetermined number of pixels which includes the edge points and which surrounds the edge points is cut out as an image block from the code book preparation image Imr. In the present embodiment, an image of a region having 7×21 pixels is cut out around the edge points. This region may include parts in which different edge points overlap each other. However, it is necessary to change the shape of the region in accordance with the direction in which the edge points belong. FIGS. 6A to 6D illustrate regions (image blocks BL1 to BL4) reduced to 3×7 in the directions of 0 degree (FIG. 6A), 45 degrees (FIG. 6B), 90 degrees (FIG. 6C) and 135 degrees (FIG. 6D). In addition, cells of the edge points are indicated by crossed slant lines in these drawings.

(Procedure 3)

The respective image blocks cut out and generated from the code book preparation image Imr by Procedure 2 above are regarded as vectors distributed in a multidimensional space, and a predetermined number of representative vectors are generated per direction using a method of vector quantization. 32 representative vectors are generated in the present embodiment, such that 4×32=128 image blocks are generated in the present embodiment.

(Procedure 4)

For an image remaining after the image blocks are cut out of the code book preparation image Imr (such a region is called non-edge region in which the amount of information as edge information has been reduced due to the cutout of the main parts of the pattern edge), an average value of its gradation values is calculated. When the image is divided into several regions, an average value may be calculated for each region.

(Procedure 5)

Identification codes are given to the image blocks generated by Procedure 3 and to the average gradation value of the non-edge region calculated by Procedure 4, and a code book is prepared so that the contents of the image blocks and the non-edge region can be referred to by the identification codes. At this point, additional information such as information on an edge detection method and information on the setting of the image blocks may be written together into the code book.

(ii) Compression of Image (Procedure 6)

The compression unit 2 shown in FIG. 1 reads the code book prepared by Procedures 1 to 5 above to acquire the information necessary for the pre-processing of the image compression, and stores the information in a predetermined storage area of the code book storage unit 20. In the present embodiment, the edge detection method and the kind of edge direction are acquired together as the additional information. In addition, it is possible to use a method which writes such information in the code book, and it is also possible to omit the reading procedure by previous arrangement.

(Procedure 7)

In response to the supply of the compression target image, for example, an 8-bit gray scale image Imo of 512×512 pixels shown in FIG. 4 from the image input unit 12, the edge detection unit 14 performs edge detection processing on this image Imo. At this point, not only the edge points but also the direction of the edge is detected as in the code book preparation procedure described above. Procedure 7 is similar to Procedure 1 in that any algorithm may be used for the detection of the edge and in that the edge points may be obtained with sub-pixel accuracy, but it is not always necessary to use the same edge detection method as that in Procedure 1. In the present embodiment, the edge points are detected pixel by pixel in directions of 0, 45, 90 and 135 degrees using the method of Canny in Procedure 1. These directions do not necessarily have to be the same as the directions written in the code book, but at least one direction written in the code book is necessary. Since the total number of extracted edge points and the kind of direction influence the compression ratio, a user may be allowed to set these by a graphical user interface (GUI).

(Procedure 8)

In accordance with a procedure similar to Procedure 2, the image block generation unit 16 cuts out, from the compression target image Imo, the image of the region around the edge points which includes the edge points detected in the compression target image Imo, and thus generates a plurality of image blocks. When the edge points are detected in sub-pixel units, the region around the pixels where the edge points are present is cut out. Here, the positional relation between the edge points and the cut out region need to be the same as the positional relation at the time of the preparation of the code book. This positional relation may be written as additional information in the code book.

(Procedure 9)

The image blocks in the direction which best corresponds to the direction of the cut-out image block are selected from the code book. In the present embodiment, a score value obtained by image matching using the matching unit 18 serves as the standard of selection. However, the selection method is not limited to this, and any parameters may be used as long as such parameters indicate the correlation of the images.

(Procedure 10)

The variable length encoding unit 22 performs the variable length encoding processing on the identification code of the image block selected and supplied by the matching unit 18 (hereinafter referred to as a similar image block) together with the edge point coordinates, and writes them as compressed data in a data file. As a result, the compression target image Imo can be written in three elements (X coordinates of the edge points, Y coordinates of the edge points, and an identification code number of the similar image block). Therefore, for example, the number of edge points is 100, coordinate values of the edge points are detected with an accuracy of 12 bits, and the number of codes of the code book is 8 bit, in which case the file size of the compression target image Imo of 256 KB is 100×(12 bits×2+8 bits) and is thus compressed to about one eightieth. In the present embodiment, no processing is particularly performed to decrease the number of edge points, so that the file size is compressed to 151 KB, remaining at about 60% compression.

The compressed data output unit 24 outputs compressed data in which edge point coordinates and identification code are written in the above mentioned manner.

(iii) Reproduction of Image

The image file compressed in Procedures 6 to 10 above is reproduced using the same code book as the code book used for the compression.

(Procedure 11)

First, the user specifies a file name of the code book used for the compression via unshown specifying means of the reproduction unit 4. In response to this specification, the code book storage unit 50 stores its contents in a predetermined storage area.

(Procedure 12)

The compressed data input unit 42 reads the compressed image file, and the variable length code input unit 44 decompresses the compressed data and supplies the edge point coordinates and the identification code of the image block to the image block composition unit. The image block composition unit 52 first secures, within an unshown storage area, a memory area corresponding to the size of the image to be reproduced. The size of the memory area in the present embodiment is 512×512. The size of the image to be reproduced may be decided by decompressing in the variable length code input unit 44 a compressed file to which the size of the compression target image is attached in Procedure 10 above, or may conform to a preset size.

(Procedure 13)

Next, the image block composition unit 52 takes the image block corresponding to the number of the identification code from the code book stored in the code book storage unit, and writes all the image blocks in the reproduced image area secured in the unshown storage area by Procedure 12 around the edge point coordinates obtained by the decompression of the compressed data and along each direction of the edge.

(Procedure 14)

Here, when an area is produced where image blocks overlap each other, the average of the gradation values of these image blocks is considered as the volume of pixels of the image to be reproduced.

(Procedure 15)

When there is an area with no gradation value, a pixel value provided as an average gradation value of the non-edge region from the code book is brought into this area. Thus, an image of 512×512×8 bits is reproduced.

Figure 5:
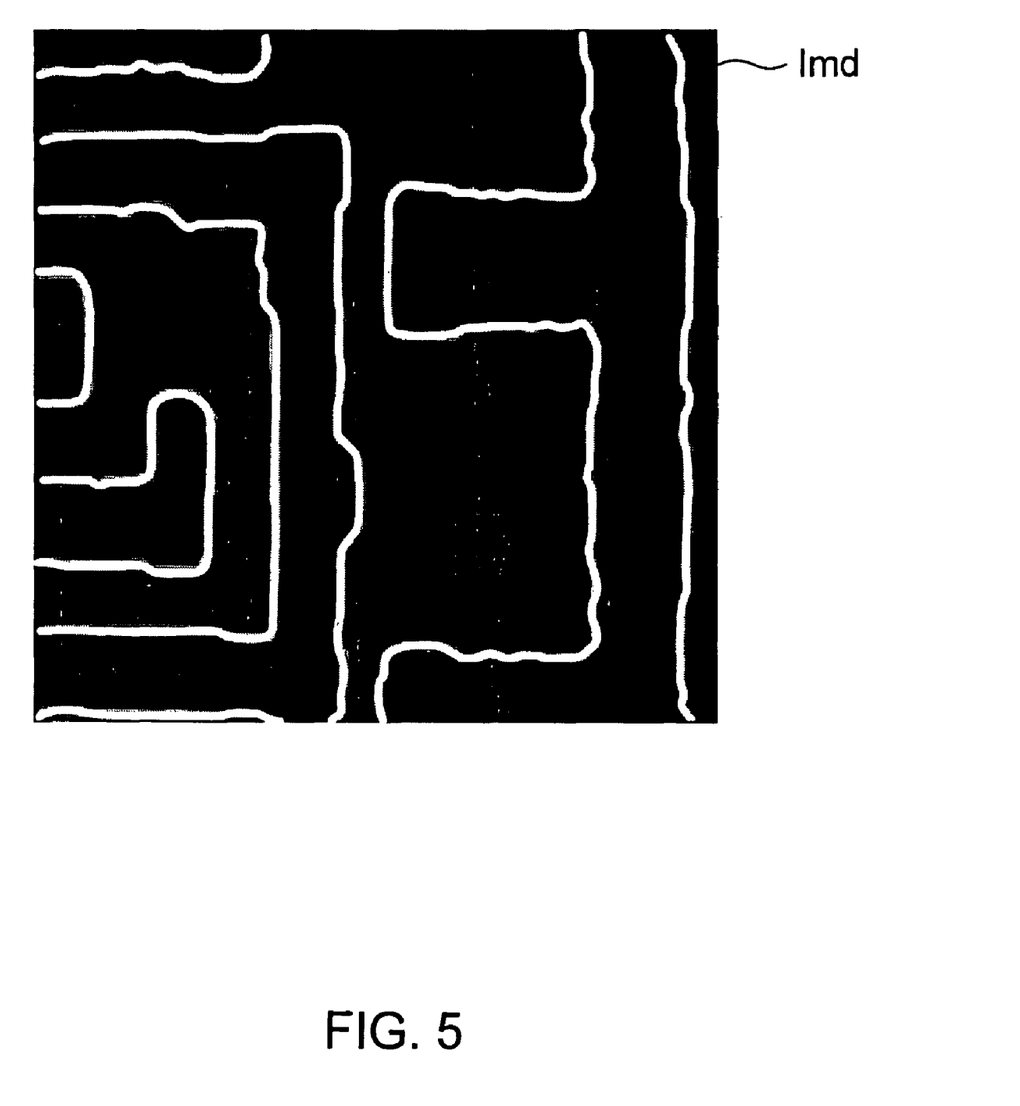
FIG. 5 is a diagram showing one example of an image reproduced according to the first embodiment of the present invention.

The image compressed and reproduced by Procedures 6 to 15 above has been subjected to color subtraction, as shown in FIG. 5. Therefore, if lossless compression such as a graphic interchange format (GIF) is applied to the reproduced image, it is possible to achieve a file size smaller than the compressed image file. In the present embodiment, the file size is compressed to 77 KB which is about ten percent of the size of the compression target image.

Thus, according to the present embodiment, natural images such as the SEM images can be efficiently compressed and reproduced with high accuracy. Moreover, costs for data storage and a load of network transfer can be reduced owing to the reduction of the file size.

Figure 7:
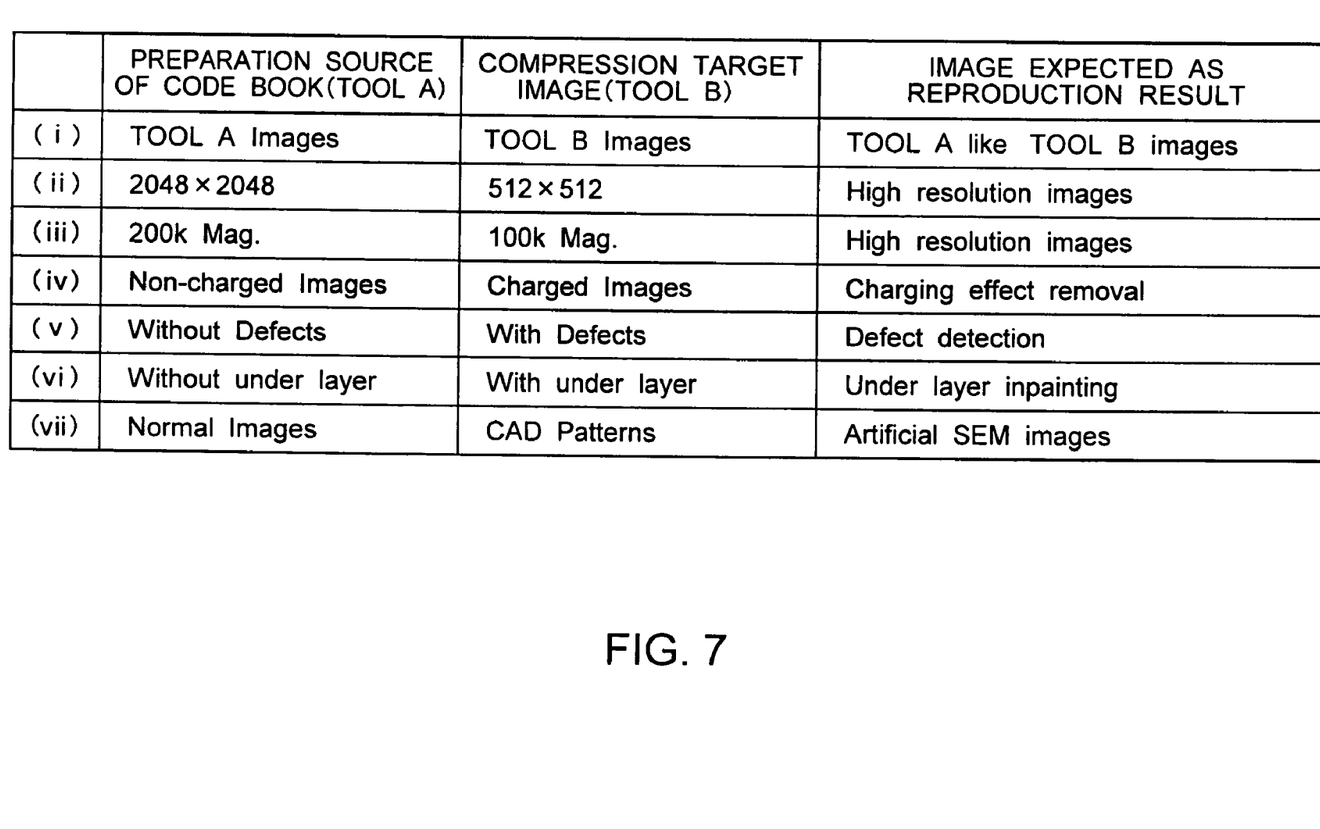
FIG. 7 is a table showing an application of the first embodiment of the present invention.

Several applications of the present embodiment are shown in a table of FIG. 7.

(2) Second Embodiment

The code book carries the average gradation value of the non-edge region in the first embodiment described above, but the average gradation value may be extracted by the procedure of compressing the compression target image Imo and written in a compressed file. At this point, when the non-edge region is divided into a plurality of regions, a more natural reproduced image can be obtained if a procedure is added which comprises calculating an average gradation value for each of the divided regions and writing the average gradation values in the code book together with the positions of the divided regions, and reading, from the code book, the positions of the divided regions and the average gradation values in image reproduction processing and writing them in the reproduced image. For example, barycentric coordinates can be used for the positions of the divided regions.

(3) Third Embodiment

In the present embodiment, procedures will be described for detecting an edge from a compression target image Imo with sub-pixel accuracy. The procedures of compression as such are the same as Procedures 6 to 10 described above in the first embodiment except that the size of a compressed file is increased. These procedures are different from Procedures 11 to 15 above in that a region for a reproduced image is prepared in a sub-pixel size in reproducing the image. That is, when an edge is requested with an accuracy of, for example, 1/10, a reproduced image is considered to be sized at 5120×5120 which is ten times the size of the memory area described above in Procedure 11 in the respective directions thereof, and image blocks are written in this region as in the first embodiment. The reproduced image thus generated has a size of 5120×5120. This image may be displayed as is, or used for remeasurement, or converted to a size of 512×512 by the compression of its pixels.

(4) Fourth Embodiment

In the present embodiment, how to apply the image processing method according to the present invention to the detection of a defect will be described. When there is a defect, it means that the kind of edge which is not present in a code book preparation image is in a compression target image. In this case, a threshold value can be set in a score value in Procedure 9 in the first embodiment described above, and this threshold value can be used to detect the defect (see (v) in FIG. 7). For example, when a score value equal to or less than the threshold value can only be obtained in matching processing by a matching unit 18, an image block part of a compression target image Imo to which a corresponding similar image block can not be allotted is written as is in a compressed file as indicated by a dotted line part in FIG. 1, and this image block is used at the time of reproduction as indicated by a dotted line part in FIG. 2, the defect can be reproduced in the reproduced image. On the other hand, when it is not desired to reproduce the defect, the threshold value of a matching score is set to 0, such that the reproduced image can be expressed almost forcibly with the image blocks in the code book alone. Further, an identification code corresponding to the block equal to or less than the threshold value of the matching score is preset in the code book, and if the gradation value is brought to, for example, 0 at the time of reproduction, the defective region emerges as a white region on a colored background in the reproduced image, such that the defect can be rapidly and easily detected.

(5) Fifth Embodiment

The present embodiment provides a method of removing, in image processing, the effect of charging due to the application of an electron beam in acquiring, for example, an SEM image.

As illustrated by the code book preparation image Imr in FIG. 1 and the compression target image Imo in FIG. 2, the code book is generally prepared using an image representing the compression target image. In the present embodiment, with an expectation of effects shown in a reproduced image, an ordinary image is used for the code book, while an image is selected as the compression target image in which the nonuniformity of contrast has been caused due to the effect of the charging. In this case as well, edges are substantially similarly detected in both of the images, but the asymmetry of the compression target image is not reproduced when the compressed image is reproduced because the code book preparation image has no asymmetry of the edge due to the change of contrast.

Thus, according to the present embodiment, it is possible to obtain a reproduced image in which the effects of the charging in the compression target image are removed, without adding new procedures (see (iv) in FIG. 7).

(6) Program

A series of procedures of the image processing method described above may be read into and executed by a computer as a program to be executed by the computer. This makes it possible to achieve the image processing method according to the present invention by use of a general-purpose computer. The program may be read by the computer after contained in a recording medium. The recording medium is not limited to a portable medium such as a flexible disk, a magnetic disk, a CD-ROM or an optical disk, and may be a fixed recording medium such as a hard disk drive or a memory. Further, the program incorporating the series of procedures of the image processing method described above may be distributed via a communication line (including wireless communication) such as the Internet. Moreover, the program incorporating the series of procedures of the image processing method described above may be distributed in an encrypted, modulated or compressed state via a wired line such as the Internet or a wireless line or in a manner stored in a recording medium.

(7) Semiconductor Device Manufacturing Method

When the defect detection method described above in the fourth embodiment is used in a process of manufacturing a semiconductor device, a defect in a pattern can be detected with high accuracy and in a short time, such that the semiconductor device can be manufactured with higher throughput and yield.

More specifically, a semiconductor substrate is extracted per production lot, and a defect in a pattern formed on the extracted semiconductor substrate is detected by the defect detection method described above. When the semiconductor substrate is judged as a nondefective product as a result of the defection, the rest of the manufacturing process is continuously executed for the whole production lot to which the evaluated semiconductor substrate belongs. On the other hand, the semiconductor substrate exceeds a threshold value set in accordance with the specifications of a product and is judged as a defective product because a defect is found therein as a result of the detection, but the semiconductor substrate can be reworked, in which case rework processing is executed for the production lot to which the semiconductor substrate judged as the defective product belongs. When the rework processing is finished, the semiconductor substrate is extracted from the production lot and again subjected to defect detection. If the extracted semiconductor substrate is judged as a nondefective product as a result of the redetection, the rest of the manufacturing process is executed for the production lot finished with the rework processing. In addition, when the rework processing is impossible, the production lot to which the semiconductor substrate judged as the defective product belongs is disposed of. When the cause of the defect can be analyzed, results of the analysis are fed back to a person in charge of designing, a person in charge of an upstream process or the like.

What is claimed is:

1. An image processing apparatus which compresses an image, comprising:
 a storage unit which stores a code book, the code book being prepared by allocating identification codes to code blocks, the code blocks being formed by executing quantization processing regarding a plurality of first image blocks as multidimensional vectors, the plurality of first image blocks being generated by cutting, in preset sizes, first regions out of a code book preparation image containing a first edge, each of the first regions surrounding and including an edge point of the first edge, the first edge being detected from the code book preparation image;
 an edge detection unit which detects a second edge from a compression target image containing the second edge;
 an image block generation unit which cuts, in preset sizes, second regions out of the compression target image to generate a plurality of second image blocks, each of the second regions surrounding and including an edge point of the detected second edge;
 a search unit which searches the code book stored in the storage unit for code blocks similar to the second image blocks; and
 an output unit which outputs information on the identification codes of the similar code blocks which have been searched for and information on coordinates of the edge points of the second image blocks.

2. The image processing apparatus according to claim 1,
 wherein information on the directions of the first edge detected from the code book preparation image is added to the code blocks,
 the code book is prepared for each of the directions of the first edge,
 the edge detection unit detects the directions of the second edge together with the second edge, and
 the search unit selects, from the code book, code blocks corresponding to the directions of the second edge to match these code blocks with the second image blocks, and outputs the code blocks which have obtained matching scores exceeding a predetermined threshold value as code blocks similar to the second image blocks.

3. The image processing apparatus according to claim 1,
 wherein there is added, to the code book, an average value of gradation values of a non-edge region together with information on the position of the non-edge region, the non-edge region being a region remaining after the first regions have been cut out of the region of the code book preparation image.

4. An image processing apparatus which reproduces a compressed image subjected to compression processing, the apparatus comprising:
 a storage unit which stores information on a code book, the code book being prepared during the compression processing by allocating identification codes to code blocks, respectively, the code blocks being formed by executing quantization processing regarding a plurality of first image blocks as multidimensional vectors, the plurality of first image blocks being generated by cutting, in preset sizes, first regions out of a code book preparation image containing a first edge, each of the first regions surrounding and including an edge point of the first edge, the first edge being detected from the code book preparation image;

a reading unit which reads coordinates of second edge points and identification codes of the compressed image, the compressed image being defined by the coordinates of the second edge points and the identification codes of code blocks similar to second image blocks among the code blocks carried by the code book, the second image blocks being image blocks of the compressed image; and an image block composition unit which takes, from the code book, the code blocks corresponding to the read identification codes to write these code blocks into a reproduced image region around the coordinates of the second edge points in order to form a reproduced image.

5. The image processing apparatus according to claim 4, wherein information on the directions of the first edge detected from the code book preparation image is added to the code blocks, the code book is prepared for each of the directions of the first edge, information on the directions of the second edge is added to the second image blocks, the code blocks similar to second image blocks are code blocks which correspond to the directions of the second edge and which have obtained matching scores exceeding a predetermined threshold value in the matching of these code blocks with the second image blocks during the compression processing, and the image block composition unit writes the image blocks corresponding to the read identification codes into the reproduced image region along the directions of the first edge.

6. The image processing apparatus according to claim 4, wherein an average value of gradation values of a non-edge region is added to the code book together with information on the position of the non-edge region, the non-edge region being a region remaining after the first regions have been cut out of the code book preparation image, and when there is a region with no gradation value in the compressed image, the image block composition unit writes the image blocks having a pixel value corresponding to the gradation value of the average value into the region with no gradation value within the reproduced image region.

7. An image processing method comprising an image compression method, the image compression method including:

detecting a first edge from a code book preparation image having the first edge;

cutting, in preset sizes, first regions out of the code book preparation image to generate a plurality of first image blocks, each of the first regions surrounding and including an edge point of the detected first edge;

executing quantization processing regarding the plurality of first image blocks as multidimensional vectors to form code blocks;

allocating identification codes to the code blocks to prepare a code book;

detecting a second edge from a compression target image having the second edge;

cutting, in preset sizes, second regions out of the compression target image to generate a plurality of second image blocks, each of the second regions surrounding and including an edge point of the detected second edge;

searching the code book for code blocks similar to the second image blocks; and outputting coordinates of the edge points of the second image blocks and the identification codes of the similar code blocks.

8. The image processing method according to claim 7, wherein the image compression method further includes detecting the directions of the first edge from the code book preparation image, and detecting the directions of the second edge from the compression target image, the code book is prepared for each of the directions of the first edge, the image compression method further includes selecting, from the code book, code blocks corresponding to the directions of the second edge to match these code blocks with the second image blocks, and outputting the code blocks which have obtained matching scores exceeding a predetermined threshold value as code blocks similar to the second image blocks.

9. The image processing method according to claim 7, wherein the image compression method further includes:

calculating an average value of gradation values of a non-edge region, the non-edge region being a region remaining after the first regions have been cut out of the code book preparation image; and adding the calculated average value to the code book together with information on the position of the non-edge region.

10. An image processing method comprising an image reproduction method of reproducing a compressed image containing an edge and subjected to compression processing, the image reproduction method including:

acquiring information on a code book, the code book being prepared during the compression processing by allocating identification codes to code blocks, respectively, the code blocks being formed by executing quantization processing regarding a plurality of first image blocks as multidimensional vectors, the plurality of first image blocks being generated by cutting out, in preset sizes, first regions out of a code book preparation image containing a first edge, each of the first regions surrounding and including an edge point of the first edge, the first edge being detected from the code book preparation image;

reading coordinates of second edge points and identification codes of the compressed image, the compressed image being defined by the coordinates of the second edge points and the identification codes of code blocks similar to second image blocks, the second image blocks being image blocks of the compressed image among the code blocks carried by the code book; and taking, from the code book, the code blocks corresponding to the read identification codes to write these code blocks into a reproduced image region around the coordinates of the second edge points in order to form a reproduced image.

11. The image processing method according to claim 10, wherein information on the directions of the first edge detected from the code book preparation image is added to the code blocks, the code book is prepared for each of the directions of the first edge, information on the directions of the second edge is added to the second image blocks, the code blocks similar to second image blocks are code blocks which correspond to the directions of the second edge and which have obtained matching scores exceeding a predetermined threshold value in the matching of these code blocks with the second image blocks during the compression processing, and the code blocks corresponding to the read identification codes are written into the reproduced image region along the directions of the second edge.

12. The image processing method according to claim 10, wherein there is added, to the code book, an average value of gradation values of a non-edge region together with information on the position of the non-edge region, the non-edge region being a region remaining after the first regions have been cut out of the code book preparation image, and when there is a region with no gradation value in the compressed image, the image blocks having a pixel value corresponding to the gradation value of the average value is written into the region with no gradation value within the reproduced image region.

13. A non-transitory computer readable medium storing a program and which causes a computer to execute an image processing method comprising an image compression method, the image compression method including:

detecting a first edge from a code book preparation image having the first edge;

cutting, in preset sizes, first regions out of the code book preparation image to generate a plurality of first image blocks, each of the first regions surrounding and including an edge point of the detected first edge;

executing quantization processing regarding the plurality of first image blocks as multidimensional vectors to form code blocks;

allocating identification codes to the code blocks to prepare a code book;

detecting a second edge from a compression target image having the second edge;

cutting, in preset sizes, second regions out of the compression target image to generate a plurality of second image blocks, each of the second regions surrounding and including an edge point of the detected second edge;

searching the code book for code blocks similar to the second image blocks; and outputting coordinates of the edge points of the second image blocks and the identification codes of the similar code blocks.

14. A non-transitory computer readable medium storing a program and which causes a computer to execute an image processing method comprising an image reproduction method of reproducing a compressed image containing an edge and subjected to compression processing, the image reproduction method including:

acquiring information on a code book, the code book being prepared during the compression processing by allocating identification codes to code blocks, respectively, the code blocks being formed by executing quantization processing regarding a plurality of first image blocks as multidimensional vectors, the plurality of first image blocks being generated by cutting out, in preset sizes, first regions out of a code book preparation image containing a first edge, each of the first regions surrounding and including an edge point of the first edge, the first edge being detected from the code book preparation image;

reading coordinates of second edge points and identification codes of the compressed image, the compressed image being defined by the coordinates of the second edge points and the identification codes of code blocks similar to second image blocks, the second image blocks being image blocks of the compressed image among the code blocks carried by the code book; and taking, from the code book, the code blocks corresponding to the read identification codes to write these code blocks into a reproduced image region around the coordinates of the second edge points in order to form a reproduced image.

* * * * *